(12) United States Patent
Sasaki et al.

(10) Patent No.: US 7,513,694 B2
(45) Date of Patent: Apr. 7, 2009

(54) COMPONENT FOR CONNECTING OPTICAL FIBERS, OPTICAL FIBER CONNECTION STRUCTURE, AND OPTICAL FIBER CONNECTING METHOD

(75) Inventors: Kyoichi Sasaki, Shizuoka (JP); Ritsu Kawase, Shizuoka (JP); Masayoshi Suzuki, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 136 days.

(21) Appl. No.: 10/521,205

(22) PCT Filed: Jul. 14, 2003

(86) PCT No.: PCT/JP03/08916

§ 371 (c)(1),
(2), (4) Date: Jan. 12, 2005

(87) PCT Pub. No.: WO2004/008214

PCT Pub. Date: Jan. 22, 2004

(65) Prior Publication Data

US 2006/0051028 A1    Mar. 9, 2006

(30) Foreign Application Priority Data

Jul. 15, 2002 (JP) ............................. 2002205329
Oct. 30, 2002 (JP) ............................. 2002315538

(51) Int. Cl.
*G02B 6/38* (2006.01)
(52) U.S. Cl. ..................................................... 385/60
(58) Field of Classification Search .................... 385/60
See application file for complete search history.

(56) References Cited

U.S. PATENT DOCUMENTS

| 5,838,856 | A | * | 11/1998 | Lee ............................. 385/54 |
| 6,435,728 | B2 | * | 8/2002 | Shimoji et al. ............... 385/56 |
| 2005/0238291 | A1 | | 10/2005 | Sasaki et al. |

FOREIGN PATENT DOCUMENTS

| JP | 56-019014 | 2/1981 |
| JP | 59-157605 | 9/1984 |
| JP | 63-280205 | 11/1988 |
| JP | 03-60402 | 9/1991 |

(Continued)

*Primary Examiner*—Uyen Chau N Le
*Assistant Examiner*—Hoang Tran
(74) *Attorney, Agent, or Firm*—Knobbe Martens Olson & Bear LLP

(57) ABSTRACT

An optical fiber connecting method not causing any damage to the optical fibers and enabling effective use of space and an optical fiber connection structure formed by the method. The optical fiber connection structure is for connecting optical fibers by means of a component for connecting optical fibers comprising two plugs for aligning at least two optical fibers and connecting them and an adapter for fixing the plugs. Each plug in which an optical fiber is inserted is attached to an adapter in the direction perpendicular to the axial direction of the optical fiber, and the plug and adapter are fixed. A modification may be made in which a latch member is provided to at least one of the plug and adapter, a latch engaging section is provided to the other, the latch member is engaged with the latch engaging section, and the plug and adapter are fixed. Another modification may be made in which a pair of plugs with ferrules and a ferrule aligning member are used, and the ends of the opposed ferrules are inside the ferrule aligning member.

8 Claims, 16 Drawing Sheets

FOREIGN PATENT DOCUMENTS

| | | |
|---|---|---|
| JP | U 05-8570 | 3/1993 |
| JP | 06-222245 | 8/1994 |
| JP | 09-258063 | 10/1997 |
| WO | WO 00/08503 | 2/2000 |

\* cited by examiner

COMPONENT FOR CONNECTING OPTICAL FIBERS, OPTICAL FIBER CONNECTION STRUCTURE, AND OPTICAL FIBER CONNECTING METHOD

This application is the U.S. National Phase under 35 U.S.C. §371 of International Application PCT/JP2003/008916 filed on Jul. 14, 2003, which claims priority of Japanese Patent Application Nos. 2002-205329 & 2002-315538, which were filed on Jul. 15, 2002 and Oct. 30, 2002. The International Application was published under PCT Article 21(2) in a language other than English.

TECHNICAL FIELD

The present invention relates to an optical fiber connection structure, a component connecting optical fibers for forming said structure, and an optical fiber connecting method, and in particular to an optical fiber connecting method comprising attaching plugs downward to the adapter.

BACKGROUND ARTS

There are components for connection, such as FC, SC, MU, LC, etc. for single core connection and MPO, MPX, MTP, etc. for multi-core connection. In general, these components for connection (connectors) can be connected by bringing face to face with each other in an axial direction of the optical fibers. In the MPO optical connector, for example, two connector plugs are inserted into both sides of an optical connector adapter so as to face with each other, by which the optical connector plugs are positioned to each other in an inside housing of the optical connector adapter so that the MT connector ferrules held at the ends of the optical connector plugs are connected by bringing face to face with each other.

Push-pull connectors which are easily put in and out in the axial direction of the optical fibers have been proposed. These push-pull connectors have advantages that optical fibers can be easily connected when the connector is connected with an adapter attached to a side board of equipments, such as back plain. However, there are problems in case of connecting the fibers on printed circuit boards (for example, mother board, etc.) or in apparatus that working hours are is prolonged because view field of operators become narrow in a direction of putting in or out the connectors and that the ends of ferrules may be damaged or broken by contacting with slit sleeves or guide pins which are used for alignment. Moreover, there are problems that the space cannot be effectively used, for example, many devices can not be installed because of the space required for putting in or out the connectors. Furthermore, it is necessary for connecting optical modules each other on the mother board or in the apparatus that the optical fibers have to be arranged with a surplus in length so as to put in or out the connectors and to maintain a handling workability. Consequently, the optical fibers become bulky on the mother board or in the apparatus and an excessive space is needed. In case of using multi-core optical fibers, there is the possibility of giving great influence on the optical characteristic of the apparatus because of remarkable occurrence of modal noises, if the optical fibers are arranged with too much slack.

DISCLOSURE OF THE INVENTION

The present invention has been completed for the purpose of solving the above problems in the prior arts in case of connecting the optical fibers extended from ends of optical elements, optical circuit package, optical circuit apparatus, etc. as mentioned above. Namely, an object of the present invention is to provide an optical fiber connecting method not causing any damage to the optical fibers and enabling effective use of space, upon fixing plugs for aligning and connecting optical fibers and, particularly, claddings to an adapter, by which connection of fibers on the printed circuit boards (for example, mother board, etc.) or in the apparatus can be easily carried out. Another object is to provide an optical fiber connection structure formed by said method. A further object is to provide a component for connecting optical fibers.

The optical fiber connection structure according to the present invention has a structure wherein optical fibers are connected by means of a component for connecting optical fibers comprising two plugs, in which at least one optical fiber is inserted respectively, for aligning said optical fibers and connecting them, and an adapter for fixing the plugs. Said optical fiber connection structure is characterized in that the plugs are fixed to the adapter by attaching each plug to the adapter in a direction perpendicular to the axial direction of the optical fiber.

In the optical fiber connection structure according to the present invention, either the plug or the adapter may be equipped with a latch member and the other has a latch engaging section(s), whereby the plugs are fixed to the adapter by engaging the latch member with the latch engaging section.

In the optical fiber connection structure according to the present invention, said plugs and adapter may have a through-hole(s) (guide pin hole) for aligning the optical fibers, and a guide pin is inserted into said through-hole(s) to fix the plug to the adapter.

In another aspect of the optical fiber connection structure according to the present invention, plugs equipped with a ferrule(s) are used. The optical fiber connection structure comprises at least a pair of plugs equipped with a ferrule(s) to which an optical fiber has been fixed, a ferrule aligning member which is moveable by sliding in a direction of the center axis of the optical fiber, and an adapter for attaching said plugs downward in a direction perpendicular to the center axis of the optical fiber and fixing it, wherein the ends of the opposed ferrules brought face to face with each other are located inside the ferrule aligning member as a result of sliding the ferrule aligning member in a direction of the center axis of the optical fiber.

In the above-mentioned case, the ferrule aligning member may be previously attached to the adapter or may be previously attached to at least one of ferrules of a pair of plugs.

A first aspect of the component for connecting optical fibers according to the present invention comprises two plugs, into which at least one optical fiber has been inserted respectively, for aligning said optical fibers and connecting them, and an adapter for fixing the plugs, wherein a latch member is provided to either the plug or the adapter, and a latch engaging section(s) is provided to the other, by which the latch member is engaged with the latch engaging section to fix the plug to the adapter. Further, a guide for aligning optical fibers may be provided to one of the plugs and adapter, and a member for aligning optical fibers which engages with the guide may be provided to the other.

A second aspect of the component for connecting optical fibers according to the present invention comprises two plugs, into which at least one optical fiber has been inserted respectively, for aligning said optical fibers and connecting them, and an adapter for fixing the plugs, wherein the plugs and the adapter have a through-hole(s) (guide pin hole) into which a guide pin is inserted.

An optical fiber connecting method comprises a step of inserting at least one optical fiber into two plugs respectively, a step of attaching said two plugs to an adapter in a direction perpendicular to the axial direction of the optical fiber and a step of fixing said two plugs to the adapter.

In the above-mentioned optical fiber connecting method, two plugs and an adapter having each a through-hole(s) (guide pin hole) for aligning optical fibers can be used. In case of using such plugs and adapter, the step of fixing the plugs to the adapter comprises previously inserting a guide pin into the through-hole(s) of each plug, opposing plugs to each other, and inserting a second guide pin into the through-hole(s) of the adapter to forcedly push the previously inserted guide pin in the plug, thereby each plug being fixed to the adapter. In order to insert the second guide pin into the through-hole of the adapter, it is possible to use a fixing member which is slidable in an axial direction of the guide pin and has a means for pushing the guide pin, whereby the second guide pin is inserted into the through-hole of the adapter by attaching the adapter to the fixing member and sliding in one direction.

Another aspect of the optical fiber connecting method according to the present invention, which is a method using a pair of plugs equipped each with a ferrule, comprises a step comprising attaching one of a pair of plugs, into which an optical fiber is inserted, downward to an adapter slidably equipped with a ferrule aligning member in a direction perpendicular to the center axis of the optical fiber and sliding said ferrule aligning member to be attached to the ferrule, a step comprising attaching the other plug to said adapter in a direction perpendicular to the center axis of the optical fiber and opposing closely the ferrules to each other, and a step of sliding the ferrule aligning member in a direction of the center axis of the optical fiber so that the ends of the opposed ferrules are located inside said ferrule aligning member. In the present invention, the plug may be equipped with a plurality of ferrules.

A further aspect of the optical fiber connecting method according to the present invention is a method using a pair of plugs equipped with a ferrule and an adapter slidably equipped with a ferrule aligning member. Specifically, it comprises a step comprising attaching one of two plugs equipped with a ferrule, into which an optical fiber is inserted, to an adapter slidably equipped with a ferrule aligning member in a direction perpendicular to the center axis of the optical fiber and sliding said ferrule aligning member to be attached to the ferrule, a step comprising attaching the other plug to said adapter in a direction perpendicular to the center axis of the optical fiber and opposing closely the ferrules to each other, and a step of sliding the ferrule aligning member in a direction of the center axis of the optical fiber so that the ends of the opposed ferrules are located inside said ferrule aligning member.

EXPLANATION OF SYMBOLS

10 and 10' . . . plug, 11 and 11' . . . optical fiber, 12 and 12' . . . ferrule, 13 and 14 . . . ferrule aligning member, 15 . . . sliding member, 20 and 21 . . . adapter, 16, 17, 18, 19, 27 and 28 . . . latch, 22, 23, 24 and 25 . . . latch engaging portion, 26 and 26' . . . plug, 30 and 31 . . . member for alignment, 32, 33 and 34 . . . adapter, 35 and 36 . . . guide for alignment, 39 . . . through-hole for inserting an optical fiber, 40 and 41 . . . guide pin hole of the plug, 43, 44, 45 and 46 . . . guide pin hole of the adapter, 48, 49, 50, 51, 51', 52, 52', 53, 53', 54, 54', 58 and 59 . . . guide pin, 60 . . . fixing member, 61 and 61 . . . optical fiber, 63 and 63' . . . microcapillary, 66 . . . adhesive tape, 67 and 67' . . . MT connector, 69 and 70 . . . guide pin hole of the plug, 80, 81, 82 and 83 . . . guide pin hole of the adapter, 73, 73', 74, 74', 85, 86, 87 and 88 . . . guide pin, 77 . . . optical fiber tape, 84 . . . index matching agent, 89 . . . adhesive, 91 and 91' . . . MU type plug, 92 and 92' . . . optical fiber, 93 and 94 . . . acrylic resin adapter, 95 and 95' . . . ferrule, 96, 97 and 97' . . . slit sleeve, 98 . . . sliding member, 100 . . . adapter, 101 . . . latch, 102 and 102' . . . plug, 103 guide pin, 104 . . . supporting member for guide pins, 105 and 105' . . . 8-core optical fiber tape.

BEST MODE FOR CARRYING OUT THE INVENTION

The embodiments of the present invention will hereinafter be described with reference to the accompanying drawings.

Figure 1:
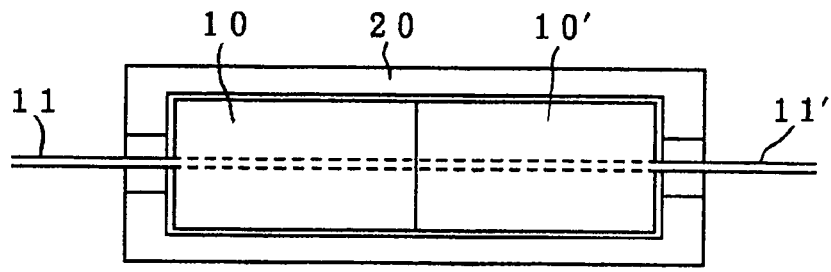
FIG. 1 is a plane view of an exemplary optical fiber connection structure according to the present invention.
Figure 2:
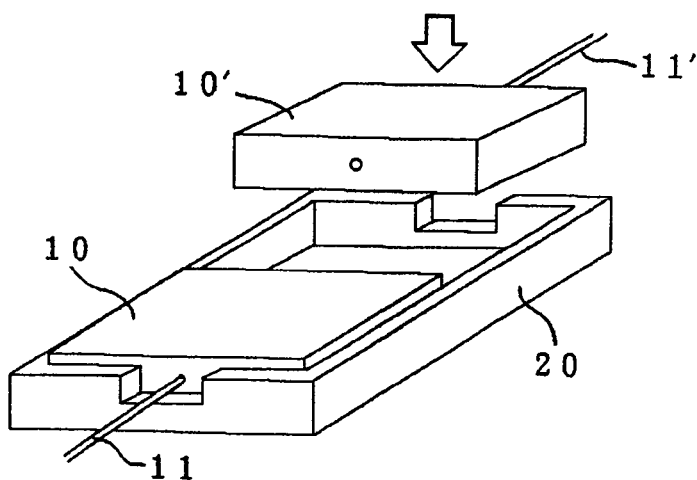
FIG. 2 is a view illustrating an optical fiber connecting method according to the present invention.

As be shown in FIG. 1, the optical fiber connection structure according to the present invention is assembled by attaching two plugs 10 and 10', into which optical fibers 11, 11' are inserted and fixed respectively, to an adapter 20. Upon assembling them, as shown in FIG. 2, plugs 10 and 10' are attached downward in a direction perpendicular to the axial direction of the optical fiber and fixed to the adapter so that ends of optical fibers oppose to each other. No particular limitation is imposed on the method for connecting the optical fibers after the plugs were attached to the adapter, and any known method for connecting the optical fibers may be suitably used. Furthermore, the optical fibers may be connected to each other by applying an refractive index matching agent between the ends of optical fibers or may be physically connected (PC) by bringing the optical fibers face to face with each other. The optical fibers used in the optical fiber connection structure according to the present invention are suitably chosen for use depending on the application purpose. For example, single mode optical fibers or multi-mode optical fibers made of quartz or plastics are preferably used.

Figure 3:
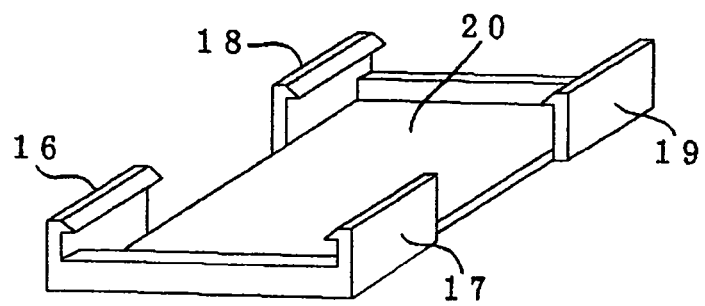
FIG. 3 is a perspective view of an exemplary adapter having a latch member.
Figure 4:
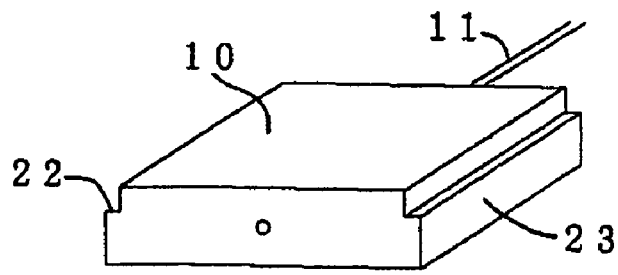
FIG. 4 is a perspective view of an exemplary plug having a latch engaging section.
Figure 5:
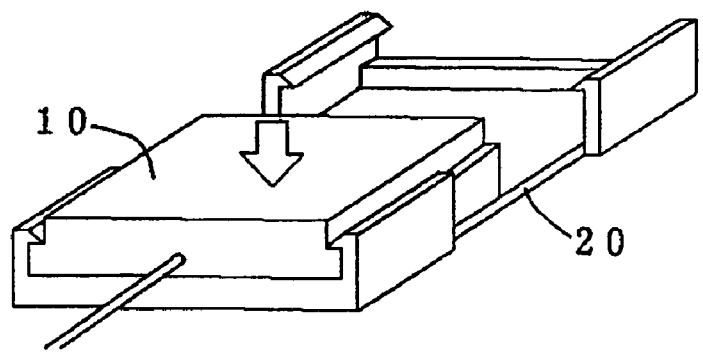
FIG. 5 is a view illustrating a method of attaching a plug shown in FIG. 4 to an adapter shown in FIG. 3.
Figure 6:
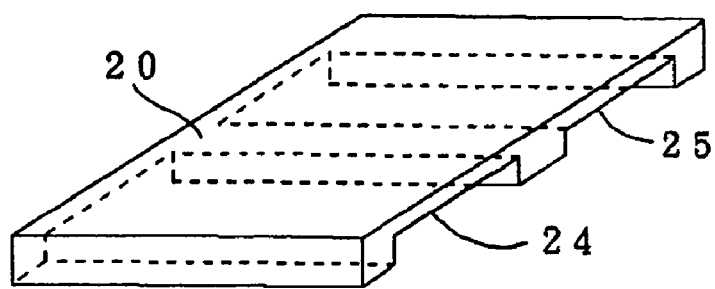
FIG. 6 is a perspective view of an exemplary adapter having a latch engaging section.
Figure 7:
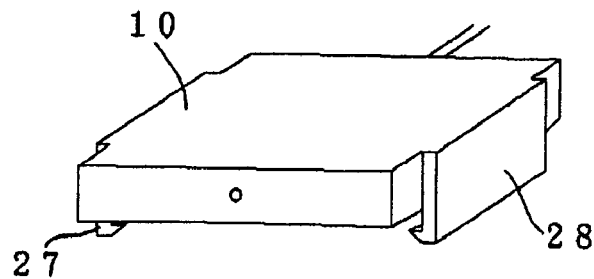
FIG. 7 is a perspective view of an exemplary plug having a latch member.
Figure 8:
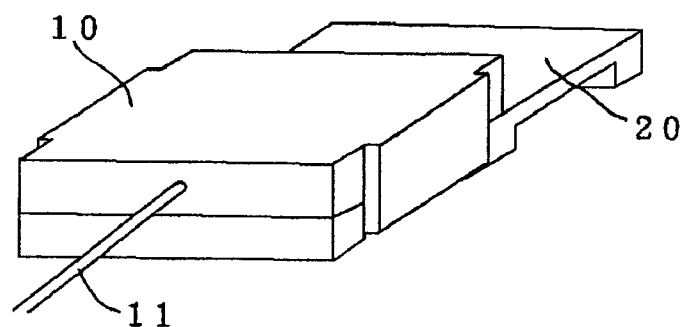
FIG. 8 is a view illustrating a method of attaching a plug shown in FIG. 7 to an adapter shown in FIG. 6.

FIG. 3 to FIG. 8 illustrate an exemplary case of assembling an optical fiber connection structure using the first component for connecting optical fibers according to the present invention. FIG. 3 is a perspective view of an exemplary adapter having a latch member and FIG. 4 is a perspective view of an exemplary plug having a latch engaging section. FIG. 5 is a view illustrating a method of attaching a plug shown in FIG. 4 to an adapter shown in FIG. 3. FIG. 6 is a perspective view of an exemplary adapter having a latch engaging section and FIG. 7 is a perspective view of an exemplary plug having a latch member. FIG. 8 is a view illustrating a method of attaching a plug shown in FIG. 7 to an adapter shown in FIG. 6.

A plug 10 has latch engaging portions 22 and 23 as shown in FIG. 4. An adapter 20 has latches 16, 17, 18 and 19 as shown in FIG. 3. At first, optical fiber 11 is inserted into the plug 10. The plug 10 is attached and pushed downward to the adapter 20 as shown in FIG. 2 to fix the plug by engaging the latches 16 and 17 with the latch engaging portions 22 and 23 (see FIG. 5). In the case that a plug 10 having latches 27 and 28 as shown in FIG. 7 is fixed to an adapter 20 having latch engaging portions 24 and 25, the plug 10 is also pushed downward into the adapter 20 in the same manner as described above to fix the plug by engaging the latches 27 and 28 with the latch engaging portion 24 (see FIG. 8).

The latches and the latch engaging section are provided for fixing the plug to the adapter in the vertical direction. It is only necessary that one of the plug and adapter has latches and the other has latch engaging section. In the case that the adapter has latches as shown in FIG. 3, there is an advantage that the plug itself and the optical fibers are not damaged by hooking etc. upon carrying the plug, because there is no projection in the plug as shown in FIG. 4. In the case that the plug has latches as shown in FIG. 7, there is an advantage that operation for attachment of the plugs can be done smoothly, because the latches can be supported by hand upon fixing to the adapter. Regarding the latch member and the latch engaging section of the plug or the adapter, it is possible to use any known shape and manner of engagement. The latches may be integrally made together with the plug or adapter. Alternatively, the latches may be made of a material different from the plug or adapter to which it is assembled. In the above explanation, the plug is inserted downward into the adapter. However, what is essential is the plug being attached to the adapter in a direction perpendicular to the axial direction of the optical fiber. For example, there is no problem, if the plug is attached to the adapter by inserting upward.

Figure 9:
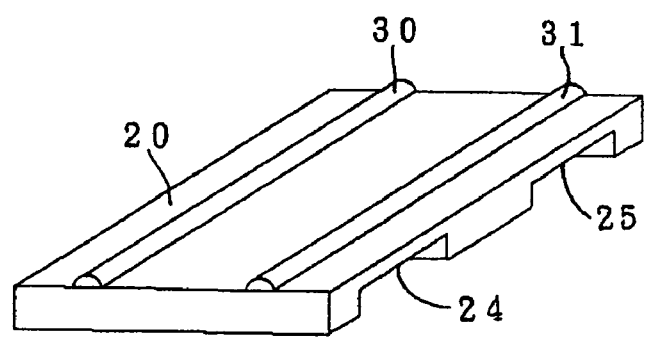
FIG. 9 is a perspective view of another exemplary adapter used in the present invention.
Figure 10:
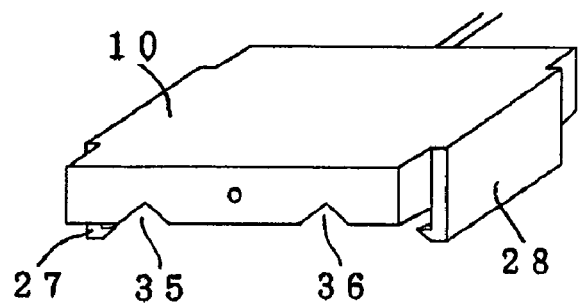
FIG. 10 is a perspective view of another exemplary plug used in the present invention.
Figure 11:
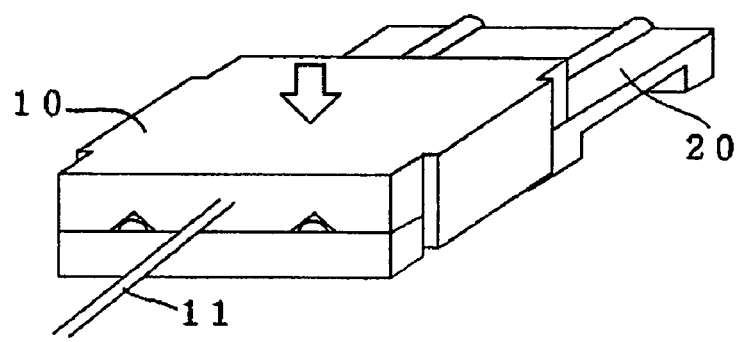
FIG. 11 is a view illustrating a method of assembling an optical fiber connection structure according to the present invention.

FIG. 9 to FIG. 11 illustrate another exemplary case of assembling an optical fiber connection structure using a first component for connecting optical fibers according to the present invention. FIG. 9 is a perspective view of another exemplary adapter and FIG. 10 is a perspective view of an exemplary plug. FIG. 11 is a view illustrating a method of assembling an optical fiber connection structure according to the present invention in which an adaptor of FIG. 9 and a plug of FIG. 10 are used. As illustrated in FIG. 9, an adapter 20 has latch engaging portions 24 and 25 and is equipped with alignment members 30 and 31 on the surface where the plugs are mounted. As illustrated in FIG. 10, the plug 10 has latches 27 and 28 and has guides for alignment 35 and 36 formed in the form of groove so that the alignment can be carried out by engaging them with said alignment members. As illustrated in FIG. 11, the plug 10 into which an optical fiber 11 is inserted is attached downward to the adapter 20, by which the alignment members 30 and 31 of the adapter fit into the guides for alignment 35 and 36, while latches 27 and 28 of the plug 10 are engaged with the latch engaging portion 24 to fix the plug to the adapter. Accordingly, alignment of two plugs can be easily conducted. According to the above-mentioned method, since the optical fibers can be connected by operating nearly right above the adapter as described above, it is not necessary to insert the optical fiber into the adapter by bending and moving in a direction of the center axis of the optical fiber, thereby it becoming possible to carry out optical connection even in a short distance of several centimeters that the optical fiber can not be bent.

FIG. 12 to FIG. 18 illustrate a connecting method in case of assembling an optical fiber connection structure using a second component for connecting optical fibers according to the present invention.

Figure 12:
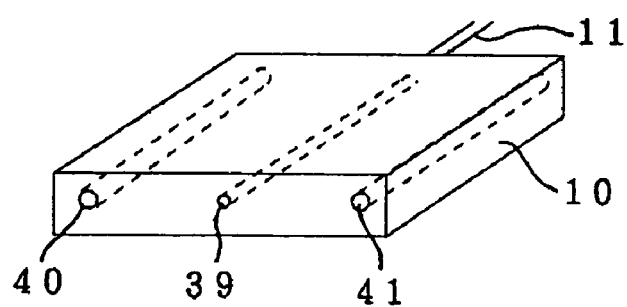
FIG. 12 is a perspective view of a further exemplary plug used in the present invention.
Figure 13:
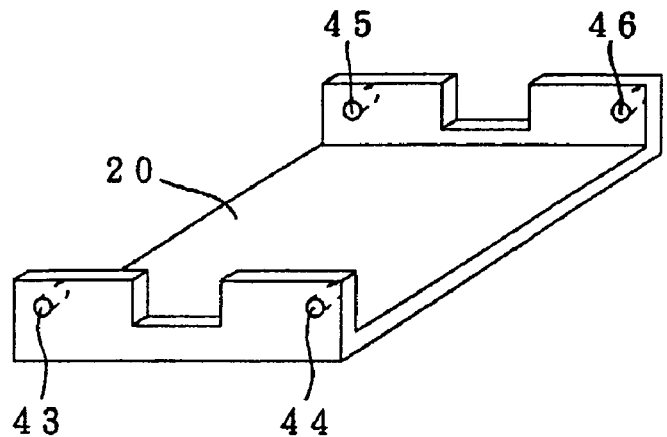
FIG. 13 is a perspective view of another exemplary adapter of a component for connecting optical fibers according to the present invention.
Figure 14:
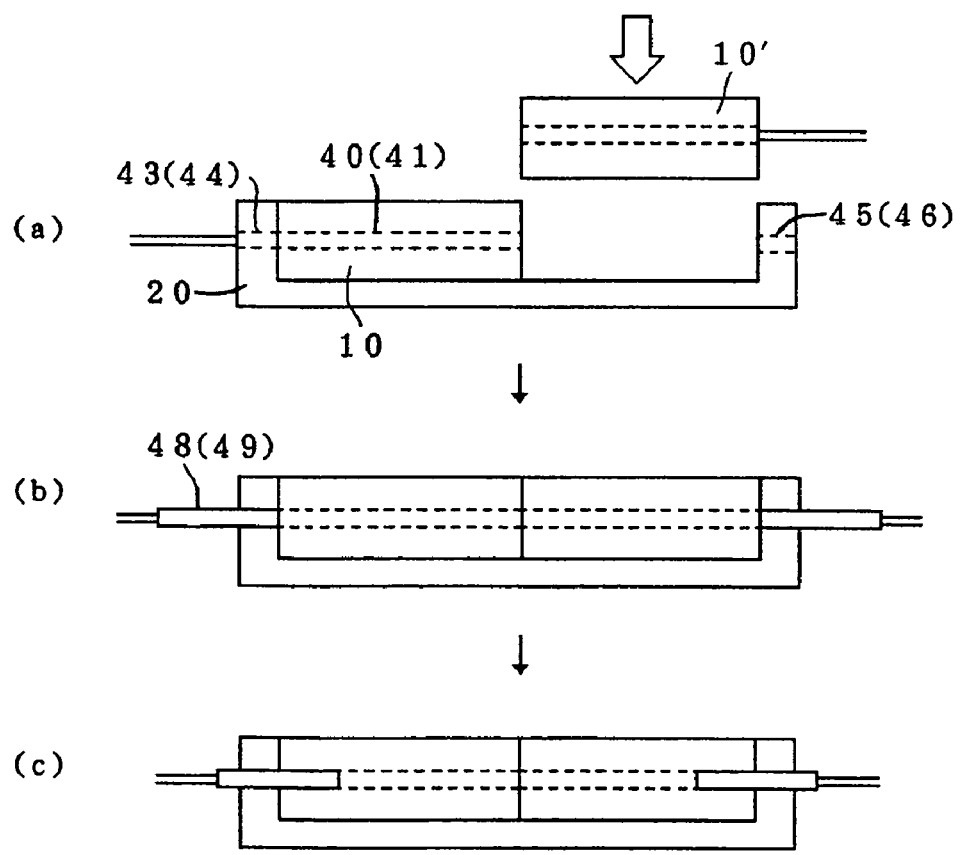
FIG. 14 is a view illustrating a method of attaching and fixing the plug shown in FIG. 12 to the adapter shown in FIG. 13.
Figure 15:
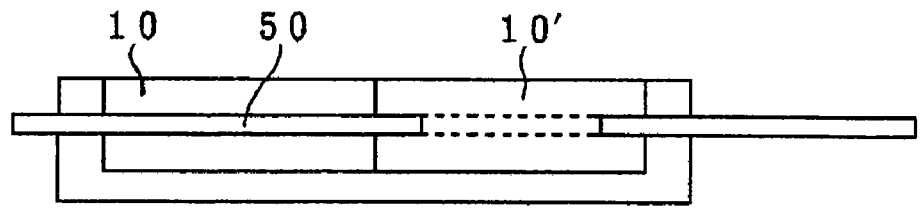
FIG. 15 is a view illustrating another exemplary optical fiber connection structure according to the present invention.

FIG. 12 is a perspective view of another exemplary plug and FIG. 13 is a perspective view of another exemplary adapter used in the present invention. FIG. 14 is a view illustrating an exemplary optical fiber connecting method which comprises attaching and fixing a plug shown in FIG. 12 to an adapter shown in FIG. 13. FIG. 15 is a view illustrating another exemplary optical fiber connection structure according to the present invention. As illustrated in FIG. 12, the plug 10 has a through-hole 39 for inserting an optical fiber into which the optical fiber 11 is inserted and fixed. The plug further has two guide pin holes (through-holes) 40 and 41. The adapter 20 of FIG. 13 has guide pin holes 43, 44, 45 and 46 for inserting a guide pin.

Fixing of the plugs 10 to the adapter 20 is conducted as illustrated in FIG. 14. Namely, the plugs 10 and 10' are attached downward to the upper surface of the adapter 20 (FIG. 14(a)). Next, guide pins 48 and 49 are inserted respectively into the guide pin holes 43 and 44 of an adapter edge so as to go through each guide pin hole (FIG. 14(b)), and then inserted into guide pin holes 40 and 41 of the plug 10, thereby the plug 10 being fixed to the adapter (FIG. 14(c)). Alternatively, as illustrated in FIG. 15, the plugs 10 and 10' can be fixed together by means of a guide pin 50 by inserting from an edge of the adapter so as to go through one of the plug 10 and inserting into the other plug 10'.

Figure 16:
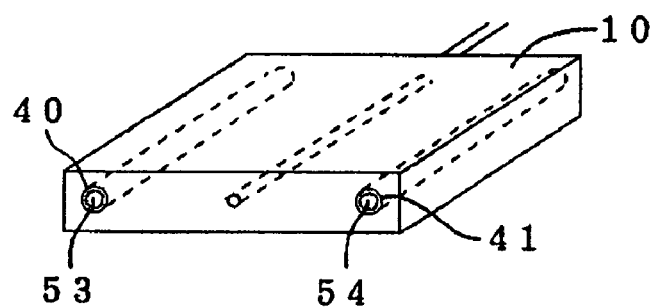
FIG. 16 is a sectional view of an exemplary plug used in the present invention.
Figure 17:
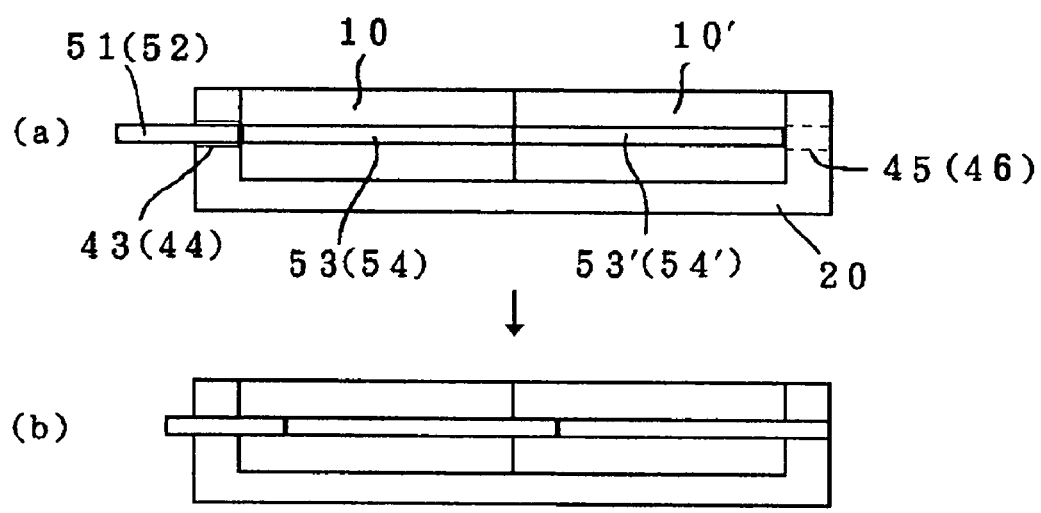
FIG. 17 is a view illustrating a method of assembling an optical fiber connection structure according to the present invention.

Furthermore, as illustrated in FIG. 16, two of the plug 10, into which guide pins 53 and 54 are previously inserted in two guide pin holes 40 and 41 of the plug, are prepared and used in order to make working space for inserting the guide pins smaller. After the plugs 10 are attached to the adapter 20 of FIG. 13 by the same manner as described above, guide pins 51 and 52 are inserted into the guide pin holes 43 and 44 respectively (FIG. 17(a)), and the guide pins 53 and 54 inserted in one of the plug 10 is then forcedly pushed in the guide pin holes of the other plug 10' as illustrated in FIG. 17. Thus, guide pins 53' and 54' inserted in the other plug are inserted into the other guide pin holes 45 and 46 of the adapter, thereby the adapter 20 and two plugs 10 and 10' are fixed. In this case, the plugs and the adapter can be separated again by forcedly pushing the guide pins 53' and 54' inserted in the guide pin holes 45 and 46 to push back the guide pins 53 and 54 in their initial situations. No particular limitation is imposed on the form of guide pin holes 53 and 54 in the plugs, and cylindrical or triangular holes are suitably used.

Figure 18:
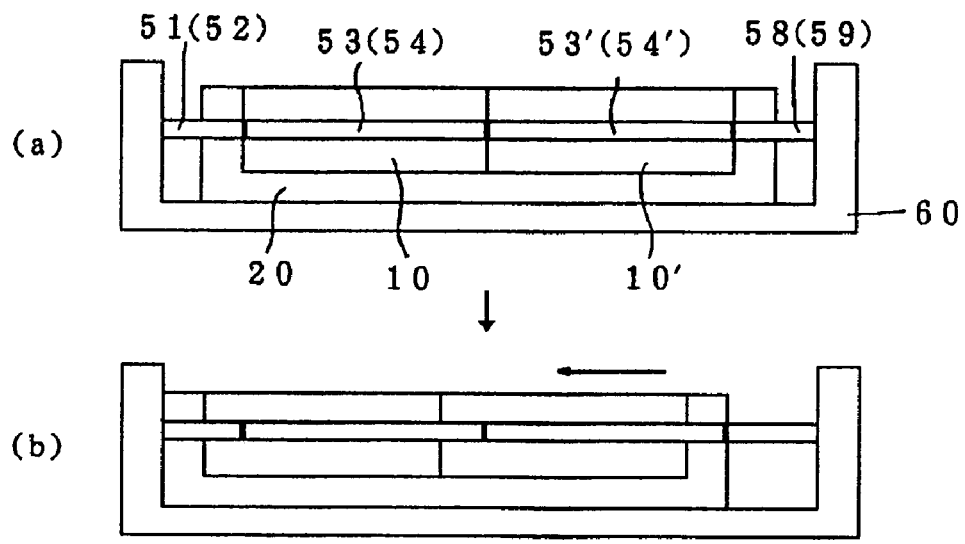
FIG. 18 is a view illustrating another method of assembling an optical fiber connection structure according to the present invention.

In order to make sure the fixing and separation of the plugs and the adapter, the adapter may be equipped with a fixing member as illustrated in FIG. 18. Namely, guide pins 51, 52, 58 and 59 for inserting into the adaptor are provided on the adapter 20 equipped with a fixing member 60 of FIG. 18 (FIG. 18(a)). Fixing can be performed by sliding the adapter in a direction of an arrow (left direction) to insert exactly and simultaneously both the guide pins 51 and 52 into through-holes of the adapter (FIG. 18(b)). According to the above-mentioned method, it becomes possible to simplify the connecting steps and to further stabilize the fixed state. In case of separating the plugs 10 and 10' from the adapter, the adapter is slid in the reversal direction (right direction), whereby guide pins inserted to the plug through the through-holes of the adapter are pushed back by the guide pins 58 and 59 provided on the fixing member, thereby separating again the plugs from the adapter. As for the fixing member 60, any form may be used so far as it has strength sufficient to insert the guide pins. No limitation is imposed on situation of the fixing member to be disposed, and it may be disposed on an upper surface or a side face of the adaptor.

Next, a case of the present invention that the optical connection is performed using plugs equipped with a ferrule respectively and a ferrule aligning member will be illustrated.

Figure 19:
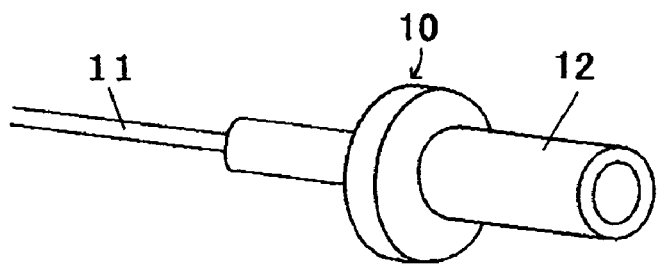
FIG. 19 is a perspective view of an exemplary plug equipped with a ferrule to which an optical fiber is fixed.
Figure 20:
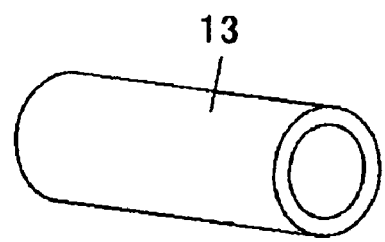
FIG. 20 is a perspective view of a ferrule aligning member having a through-hole.

As illustrated in FIG. 19, the plug 10 is equipped with a ferrule 12 for fixing an optical fiber 11, and the optical fibers is fixed by the ferrule. As illustrated in FIG. 20, a ferrule aligning member 13 has a through-hole which has accuracy sufficient to carry out alignment of the optical fiber 11 located in the center of the ferrule.

In the above-mentioned case, the plugs may be used in such a manner that the optical fiber, the end of which has been cut, is fixed in the ferrule so that the end of the optical fiber is located near the end of the ferrule. The end of the optical fiber may not be polished or may be polished after the optical fiber is fixed in the ferrule.

No particular limitation is imposed on material of the plug so far as it keeps its shape. A pair of plugs to be connected may be made of the same material or different material each other. The material can be suitably chosen for use depending upon the kind of optical fibers, installation environment, and application purposes. For example, glass, plastic, ceramic and metal such as aluminum, stainless steel, etc. are preferred to use. Furthermore, the plug may be made by integrated molding together with the ferrule.

No particular limitation is imposed on material and form of the ferrule provided on the plug. As the material, zirconia, glass, plastic, ceramic, metal, etc. are preferred to form the ferrule. As for the form, ferrules having a cross-section of circle and rectangle are preferred to use. As for the through-hole into which the optical fiber is inserted and fixed, any shape can be chosen so far as it can fix stably the optical fiber. Through-hole being circular or triangular in cross section is preferred to use. Furthermore, the optical fiber may be permanently fixed with an adhesive or may be exchangeably fixed by mechanical holding. Moreover, no limitation is imposed on the number of through-hole in the ferrule. The ferrule may have the through-hole which is capable of fixing a plurality of optical fibers for the purpose of maintenance.

The ferrule aligning member can be suitably chosen depending upon kind of ferrule, kind of optical fiber and installation environment. A glass tube, a plastic tube, a metal tube and a ceramic tube are preferred to use. The ferrule aligning member may be made of some kind of composite materials. For example, it can be assembled by mounting a metal tube on a plastic or glass member having a V-shaped groove and fixing it with a fixing member. No limitation is imposed on the number of through-hole in the ferrule aligning member so far as the ferrule aligning member can hold its mechanical strength and the position and the form of the hole is not changed at all. For example, the ferrule aligning member may have a lot of through-holes so as to simultaneously align a number of ferrules or may have through-holes more than the number of optical fibers to be connected for maintenance. Form of the through-hole provided in the ferrule aligning member is suitably chosen depending upon the form of the ferrule. In case of connecting cylindrical ferrules to each other, for example, a through-hole which is circular, triangular or tetragonal in cross section is preferred to use. Incidentally, it is possible to use a ferrule aligning member which is prepared by mounting a flat plate on an upper face of a member having a V-shaped groove, thereby forming a through-hole triangular in cross section. A through-hole in which the inner diameter of the edges thereof is the largest and that of the central part is the smallest is preferred so as to make insertion of the ferrule easier. For example, those beveled or shaped in a conical form at the end surfaces thereof are preferably used. Incidentally, since no particular limitation is imposed on the external form of the ferrule aligning member, it can be suitably chosen to use.

Figure 21:
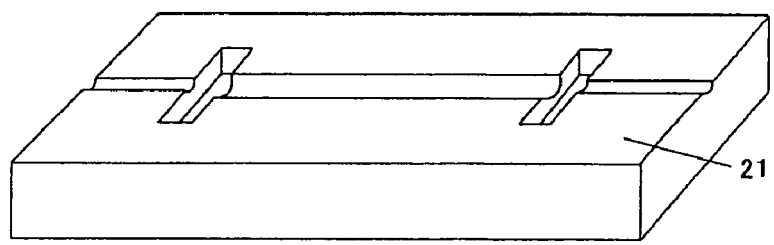
FIG. 21 is a perspective view of an exemplary adapter used for the optical fiber connecting method and for an optical fiber connection structure according to the present invention.
Figure 22:
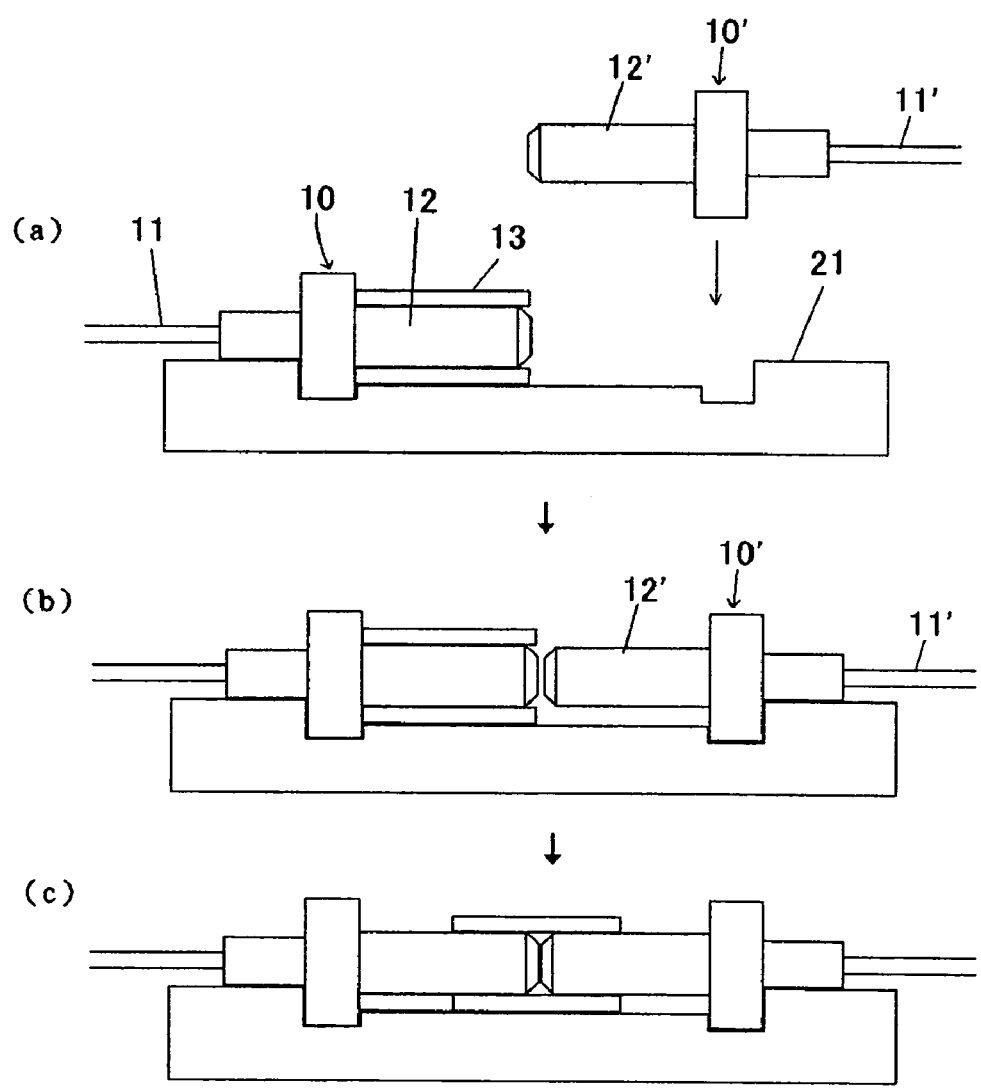
FIG. 22 is a flow chart illustrating another exemplary optical fiber connecting method according to the present invention.

FIG. 21 is a perspective view of an exemplary adapter used for the optical fiber connecting method and for the optical fiber connection structure when the above-mentioned plugs equipped with a ferrule and the above-mentioned ferrule aligning member are used. FIG. 22 is a flow chart illustrating an optical fiber connecting method according to the present invention in case of using an adapter of FIG. 21 to fix the plug. Another optical fiber connection structure according to the present invention comprises a pair of plugs 10 and 10' equipped with ferrules 12 and 12' in which optical fibers 11 and 11' have been fixed respectively, a ferrule aligning member 13 as illustrated in FIG. 20, and an adapter 21 shown in FIG. 21. First, the ferrule aligning member 13 is attached to one of the plugs in which the optical fibers are fixed. The plug 10 is attached downward to the adapter 21, and then the other plug 10' is attached downward to the adapter 21 so that ends of the ferrules are opposite to each other (FIG. 22(a) and FIG. 22(b)). As illustrated in FIG. 22(c), the ferrule aligning member 13 is then allowed to slide along the ferrules 12 and 12' so that the ends of the ferrules are located inside the ferrule aligning member, thereby completing alignment of the ferrules 12 and 12'. Thereafter, pressure is applied to the plugs 10 and 10' in a direction of the center axis of the optical fiber to form PC connection of the ends of ferrules, thereby completing connection of optical fibers 11 and 11'. By fixing the plugs to the adapter as described above, the connection can be stably carried out and the optical fibers can be fixed easily to printed circuit boards etc. The ferrule aligning member may be used in a form of slit sleeve where a part of the circumference of the through-hole is separated, thereby the ferrules being supported stably.

In the optical fiber connection structure according to the present invention as above-mentioned, it is preferred that the plugs and adaptor are equipped with a latch member and a latch engaging section so as to fix them mechanically. Because it makes it possible to repeatedly attach to and detach from the adapter the plugs in a direction perpendicular to the center axis of the optical fiber, that is, from upper position above the adapter. Regarding the latch member and the latch engaging section, any known form and method for engagement may be used. The latch member may be molded together with the plug or adapter in a body. Alternatively, the latch member may be made of a material different from that of the plug or adapter with which the latch member assembled. In the above explanation, the plug is inserted downward to the adapter. No problem is however caused, if the plug is attached upward to the adapter. No particular limitation is imposed on a method of fixing the ferrule to the plug. The ferrule may be fixed mechanically or with an adhesive, etc. Although no limitation is imposed on a means for keeping pressure between the ferrules, it is more preferred to interposing a material having elasticity such as an elastomer or a spring, etc. between the plug and the ferrule.

Figure 23:
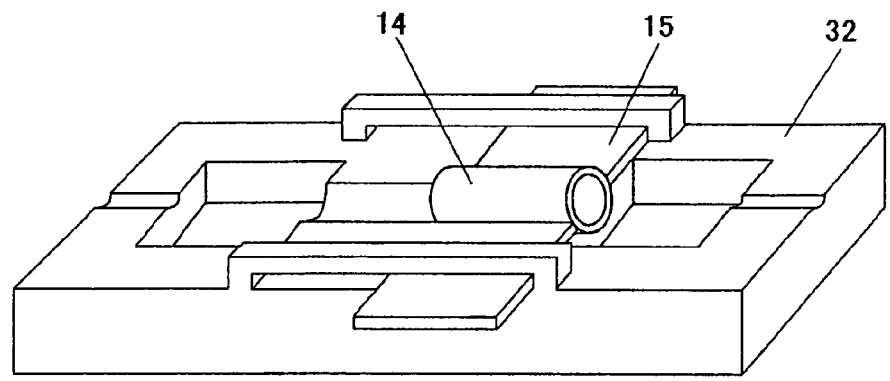
FIG. 23 is a perspective view of another exemplary adapter used for the optical fiber connecting method and for the optical fiber connection structure according to the present invention.
Figure 24:
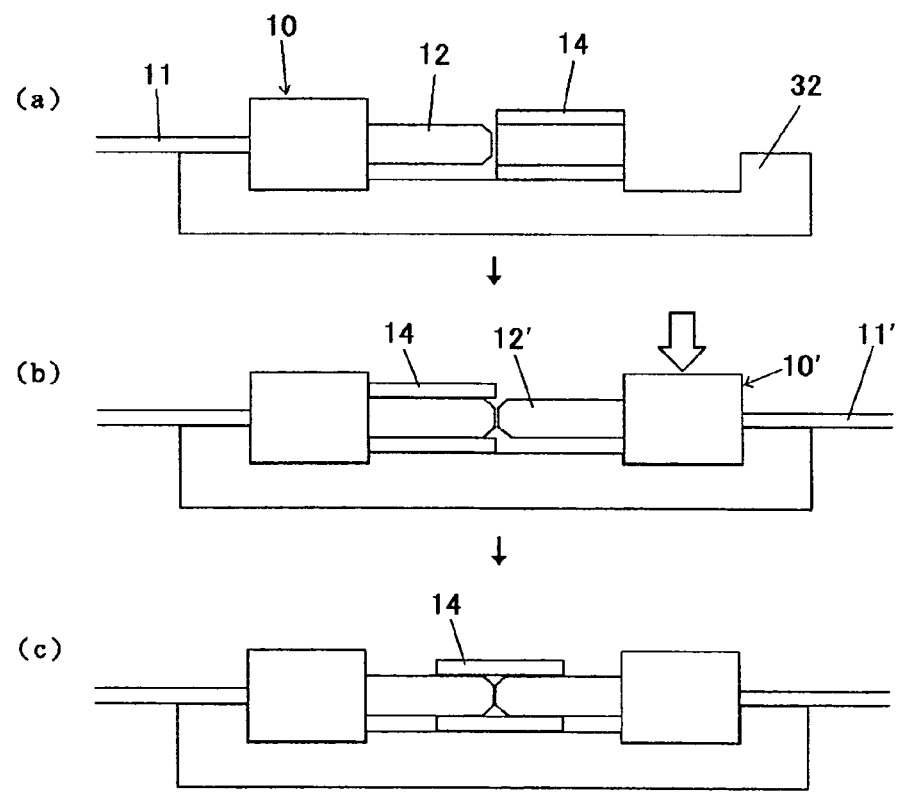
FIG. 24 is a flow chart illustrating an optical fiber connecting method according to the present invention in case of using the adapter shown in FIG. 23.

FIG. 23 is a perspective view of another exemplary adapter used for an optical fiber connecting method and for an optical fiber connection structure according to the present invention. FIG. 24 is a flow chart illustrating an optical fiber connecting method according to the present invention in case of using an adapter of FIG. 23. Another optical fiber connection structure according to the present invention comprises a pair of plugs 10 and 10' assembled by the same manner as in case of FIG. 19 and an adapter 32 shown in FIG. 23. The adapter 32 is equipped with a ferrule aligning member 14 which is mounted on a sliding member 15 so as be capable of sliding in a direction of the center axis of the optical fiber. First, a ferrule aligning member 14 is allowed to slide in the right direction and one of the plugs 10 in which an optical fiber is fixed respectively is attached downward to an adapter 32 as illustrated in FIG. 24(a). Thereafter, the ferrule aligning member is allowed to slide in the left direction so that the end of the ferrule 12 penetrates the ferrule aligning member 14, and the other plug 10' is then attached downward to the adapter (FIG. 24(b)). The ferrule aligning member 14 is then allowed to slide in the right direction so as to locate the ends of ferrules 12 and 12' within the ferrule aligning member 14, thereby completing alignment of the ferrules 12 and 12'. Pressure is then applied to each of the plugs 10 and 10' in a direction of the center axis of the optical fiber so as to connect (PC) each end of the ferrules, thereby completing connection of the optical fibers 11 and 11' (FIG. 24(c)). In the above-mentioned case, it is not necessary to carry out attaching a ferrule aligning member to the adapter, since the ferrule aligning member has been previously attached slidably to the adapter. Furthermore, connection operation can be simplified because of requiring fewer parts for composing the plug.

Figure 25:
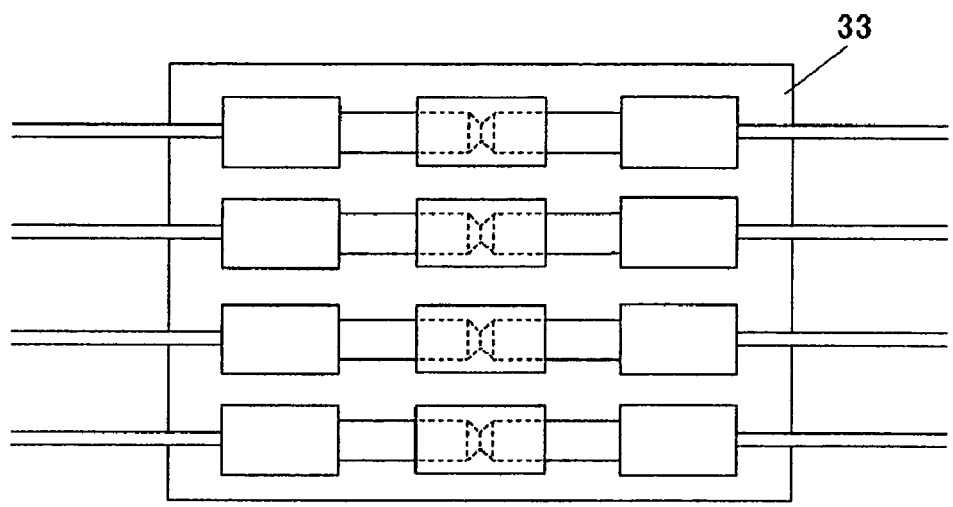
FIG. 25 is a plane view of an exemplary optical fiber connection structure according to the present invention.
Figure 26:
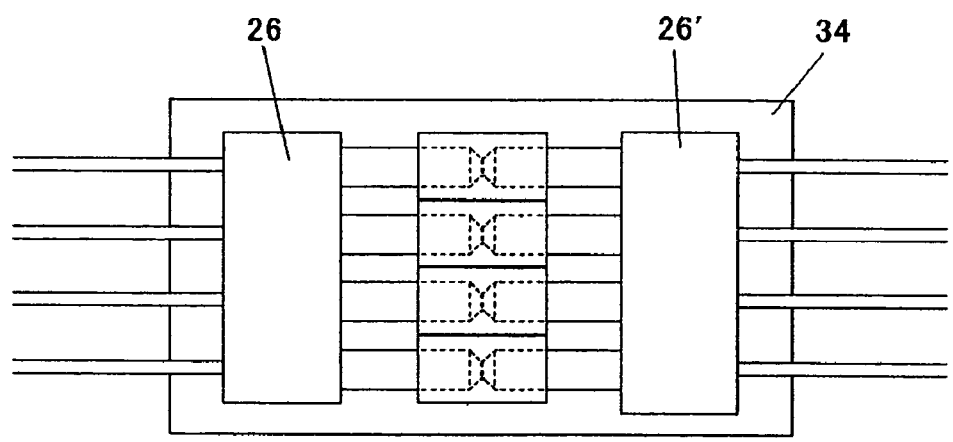
FIG. 26 is a plane view of another exemplary optical fiber connection structure according to the present invention.

The optical fiber connecting method of the present invention can be used for connecting a large number of optical fibers. FIG. 25 and FIG. 26 are each a plane view of an optical fiber connection structure of such a case. A number of optical fibers can be collectively connected by fixing a number of plugs in rows, each of which is equipped with one ferrule, to an adapter 33 as illustrated in FIG. 25, or by fixing plugs 26 and 26' which are equipped with a number of ferrules to an adapter 34 as illustrated in FIG. 26.

In the present invention, any material and form of the adapter may be used so far as it can fix the plugs. Materials such as plastic, ceramic, metal, etc. can be suitably used. A plain plate is preferred so as to fix the plugs easily. It may have a jig for fixing.

The present invention will hereafter be described in detail by the following examples. However, the present invention is not limited to these examples.

EXAMPLE 1

Figure 27:
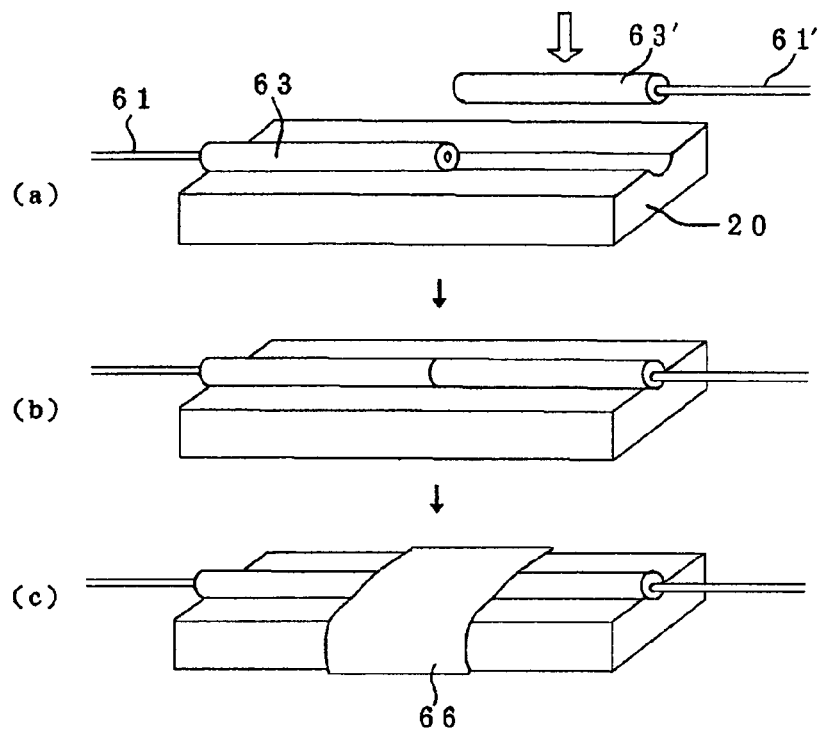
FIG. 27 is a view illustrating a method of assembling an optical fiber connection structure according to Example 1.

An optical fiber connection structure was assembled in such a manner as illustrated in FIG. 27. First, coatings of optical fibers 61 and 61' (products of The Furukawa Electric Co., Ltd.; diameter: 250 µm) were removed by 25 mm from their ends to expose a cladding (diameter: 125 µm) of each optical fiber. The claddings and cores of the optical fibers were cut at a portion 15 mm away from the end to adjust length of the claddings to 10 mm. Thereafter, the claddings of the optical fibers were inserted into respective microcapillaries 63 and 63' as plugs (products of Nippon Electric Glass Co., Ltd.; outer diameter: 0.9 mm, inner diameter: 0.126 mm; length: 10 mm) from one ends thereof, and the optical fiber claddings were aligned so that the end surfaces thereof were located at the other ends of the microcapillaries. The optical fibers were then fixed to the microcapillaries at the inserting end thereof by means of an epoxy adhesive (EP-007; product of Cemedine Co., Ltd.). Two microcapillaries 63 and 63', to which optical fibers 61 and 61' had been fixed in such a manner, were provided. An adapter 20 of an acrylic resin was fabricated by cutting. As illustrated in FIG. 27(a), microcapillaries into which the optical fiber had been inserted were attached downward to the adapter. Thereafter, the microcapillaries were brought face to face with each other as illustrated in FIG. 27(b). The microcapillaries 63 and 63' were then fixed to the adapter 20 by means of an adhesive tape 66, thereby forming an optical fiber connection structure according to the present invention (FIG. 27(c)).

In the above-mentioned method, the optical fibers was connected easily. Furthermore, the optical fibers were prevented from being damaged because the plugs were attached downward in a direction perpendicular to the axial direction of the optical fibers.

Thereafter, a connection loss was measured at the junction point of the optical fibers and was found to be 0.7 dB or less. The connection structure was thus sufficiently usable as an optical connection structure.

EXAMPLE 2

Figure 28:
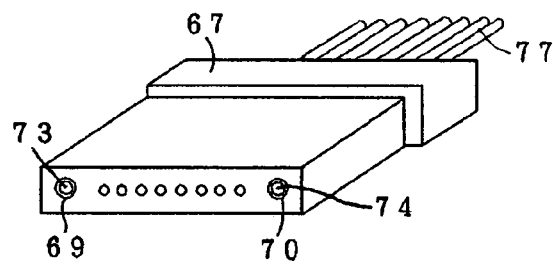
FIG. 28 is a perspective view of a MT connector used in Example 2.
Figure 29:
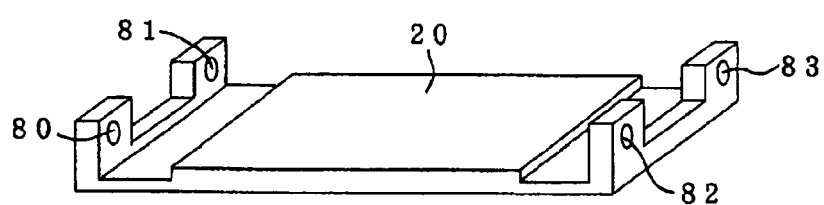
FIG. 29 is a perspective view of an adapter used in Example 2.
Figure 30:
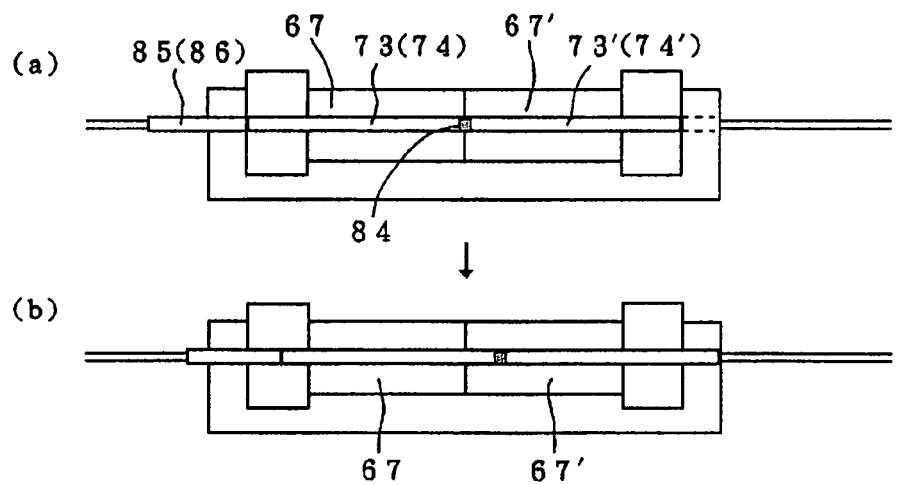
FIG. 30 is a view illustrating a method of assembling an optical fiber connection structure according to Example 2.

An optical fiber connection structure was formed in such a manner as illustrated in FIG. 30. As illustrated in FIG. 28, an 8-core MT connector (product of Hakusan Seisakusho Co. Ltd.; for single mode) was used as a plug, and an 8-core optical fiber tape 77 (product of The Furukawa Electric Co., Ltd.; diameter: 250 μm) was attached to a ferrule of the plug. Guide pins 73 and 74 having the length same as that of guide pin holes 69 and 70 of the MT connector were inserted into respective guide pin hole so that the inserting ends of guide pins reached the edges of guide pin holes. Two MT connectors thus-obtained were provided. An adapter made of acrylic resin having a structure shown in FIG. 29 was provided. After an index matching agent 84 was applied to ends of plugs of the above-mentioned two MT connector 67 and 67', the plugs were attached downward in a direction perpendicular to the axis of optical fibers to the adapter 20 (FIG. 30(a)). Thereafter, guide pins were inserted respectively into guide pin holes 80 and 81 located in one edge of the adaptor. The guide pins were inserted into the MT connector 67 as a result of pushing the guide pins 73 and 74 which had been previously inserted into the MT connector. Guide pins 73' and 74' which had been previously inserted in guide pin holes of the other MT connector 67' were pushed by the above-mentioned guide pins. As a consequence of the guide pins 73' and 74' being pushed, they were inserted in guide pin holes 82 and 83 located in the other edge of the adapter, thereby fixing the MT connectors to the adapter (FIG. 30(b)).

In the above-mentioned method, the optical fibers was feasible with ease. Furthermore, in the thus-obtained optical fiber connection structure, characteristic of MT connectors did not change and the optical fibers were prevented from being damaged.

Thereafter, a connection loss was measured at the junction point of the optical fibers and found to be 0.7 dB or less. The connection structure was thus sufficiently usable as an optical connection structure.

EXAMPLE 3

Figure 31:
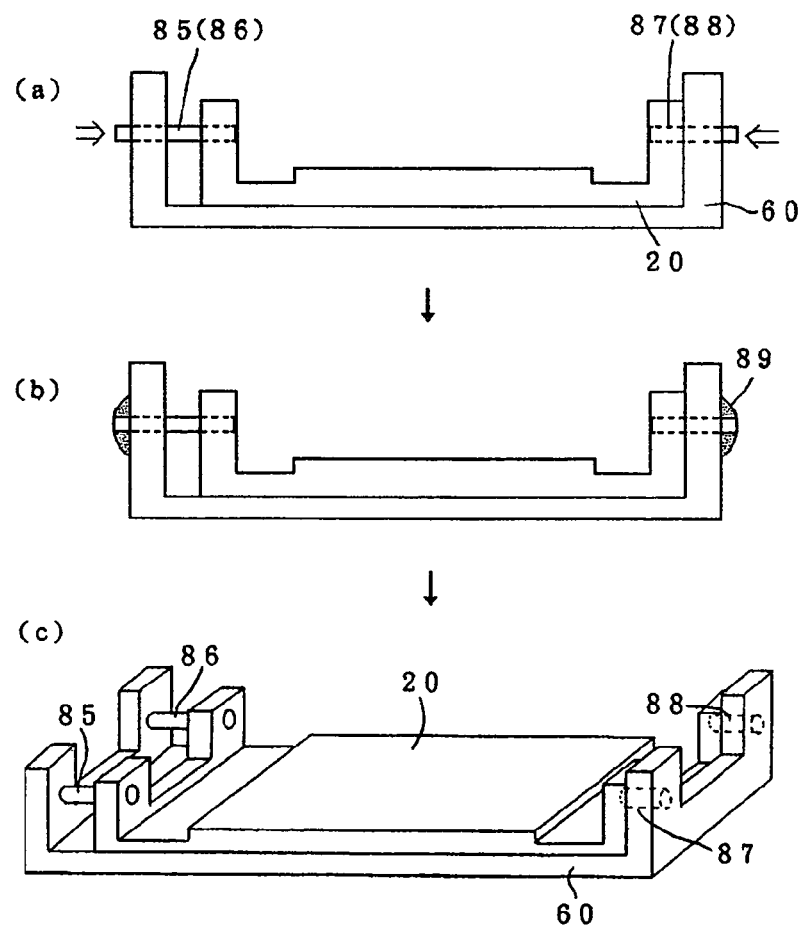
FIG. 31 is a view illustrating a method of assembling an adapter used in Example 3 wherein (c) is a perspective view of the adapter.
Figure 32:
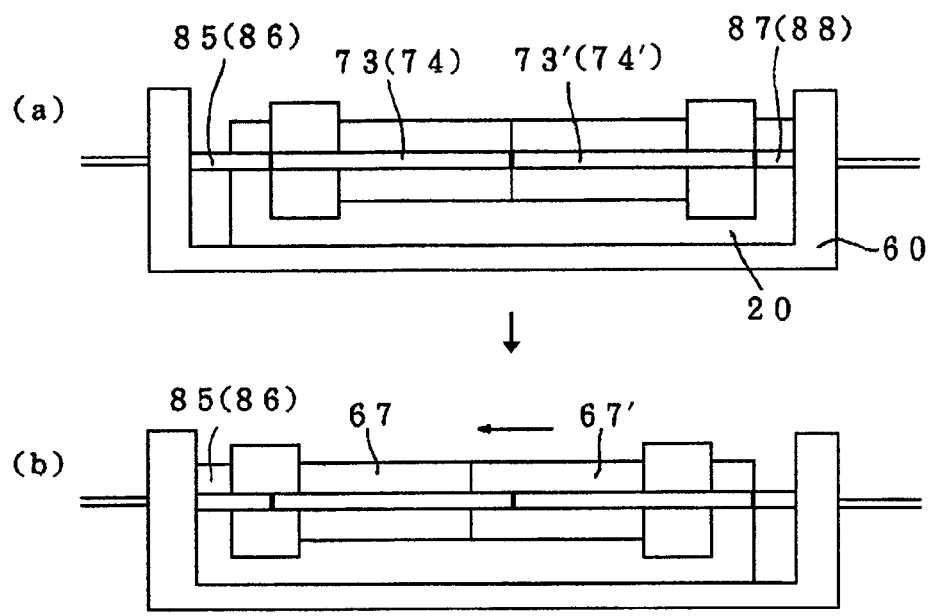
FIG. 32 is a view illustrating a method of assembling an optical fiber connection structure according to Example 3.

A fixing member 60 provided with through-holes for fixing guide pins 85, 86, 87, and 88 was put to an adapter 20 of FIG. 29 fabricated in Example 2 so that the right edge of the adaptor 20 came in contact with the right side of the fixing member 60. As illustrated in FIG. 31 (a), guide pins 85, 86, 87, and 88 were then inserted into the through-holes of the fixing member so that inserting ends of guide pins located in the inside face of the adapter 20. Thereafter, an epoxy adhesive 89 (EP-007; product of Cemedine Co., Ltd.) was used for fixing the guide pins as illustrated in FIG. 31(b) to form an adapter having a structure shown in FIG. 31(c). To the adapter were attached an 8-core MT connectors 67 and 67' of Example 2 by the same manner as in Example 2 (FIG. 32 (a)), followed by sliding the adapter to the fixing member 60, by which the guide pins 85 and 86 were inserted into the MT connector 67 to form an optical fiber connection structure according to the present invention (FIG. 32(b)).

In the above-mentioned method, connection between the optical fibers was feasible with ease. Furthermore, in the thus-obtained optical fiber connection structure, characteristics of MT connectors did not change and the optical fibers were prevented from being damaged.

Thereafter, a connection loss was measured at the junction point of the optical fibers and found to be 0.7 dB or less. The connection structure was thus sufficiently usable as an optical connection structure.

EXAMPLE 4

Figure 33:
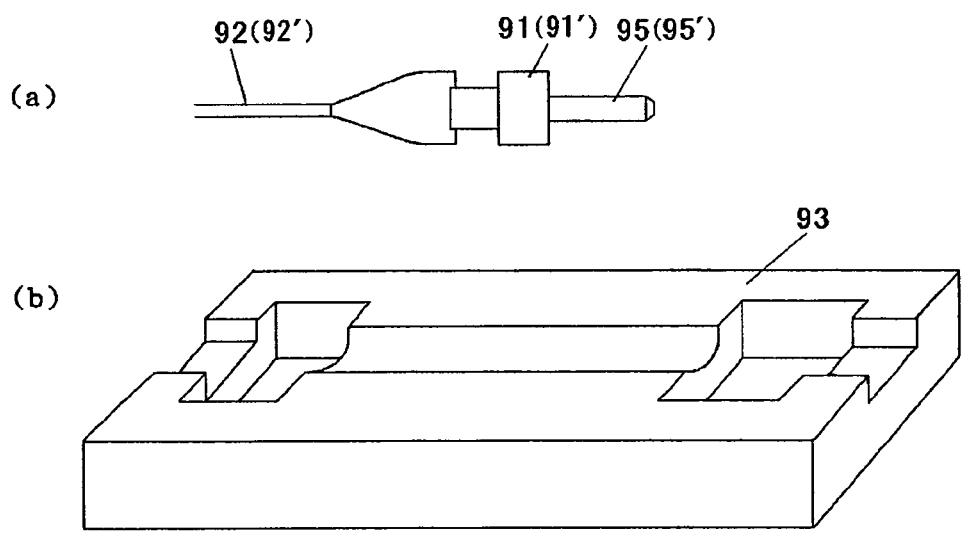
FIG. 33 shows a section view of a plug and a perspective view of adapter used in Example 4.
Figure 34:
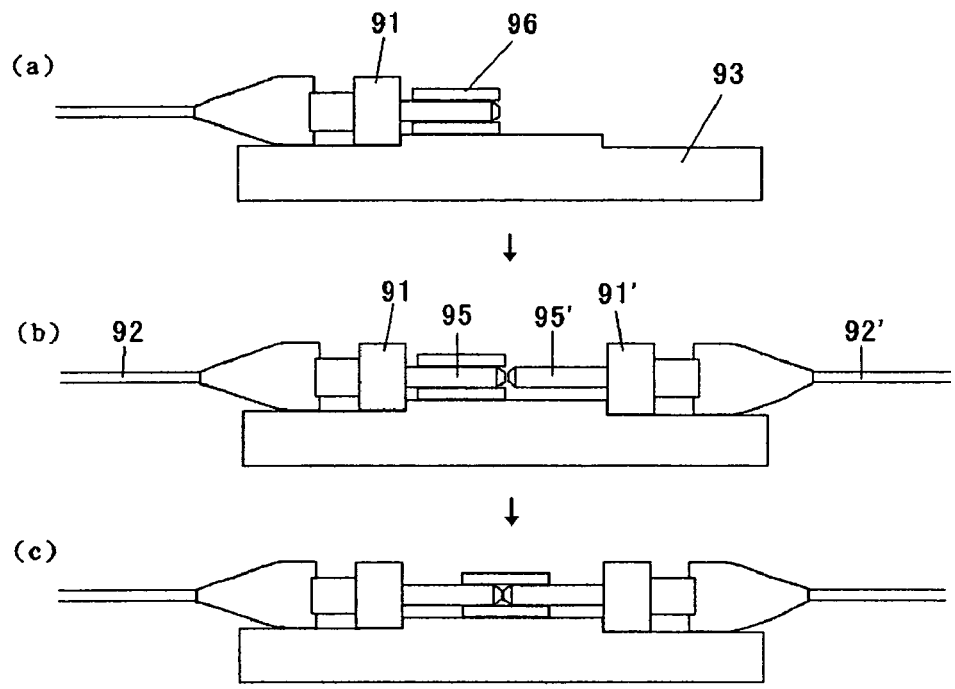
FIG. 34 is a flow chart illustrating an optical fiber connecting method according to Example 4.

Two MU plugs (91 and 91') (products of Sanwa Denki Kogyo Co., Ltd.; having zirconia ferrules) as illustrated in FIG. 33 (a) were provided. Coatings of optical fibers 92 and 92' (products of The Furukawa Electric Co., Ltd.; diameter: 900 μm) were removed from the vicinity of their ends to expose a cladding (diameter: 125 μm) of each optical fiber. They were inserted into ferrules (95 and 95'), fixed to the ferrules, and were polished to obtain plugs. On the other hand, an adapter 93 as illustrated in FIG. 33(b) was fabricated by molding an acrylic resin. A metal slit sleeve 96 (product of Sanwa Denki Kogyo Co., Ltd.; made of phosphor bronze) was attached to the ferrule 95 of the plug. The plug 91 was then attached downward to the adapter 93 in a direction perpendicular to the axis of optical fiber (FIG. 34(a)). Thereafter, the plug 91' was attached downward to the adapter 93 in the same manner as mentioned above so that ends of ferrules faced near each other (FIG. 34(b)). The slit sleeve 96 was then allowed to slide till the ends of two ferrules were located inside the slit sleeve. Further, the plugs were forcedly pushed so that end surfaces came in contact with each other, thereby forming an optical fiber connection structure according to the present invention (FIG. 34(c)).

In the thus-obtained optical fiber connection structure, the optical fibers were prevented from being damaged because the plugs were attached downward, and the connection between the optical fibers was feasible with ease.

Thereafter, a connection loss was measured at the junction point of the optical fibers and found to be 0.2 dB or less. The connection structure was thus sufficiently usable as an optical connection structure.

EXAMPLE 5

Figure 35:
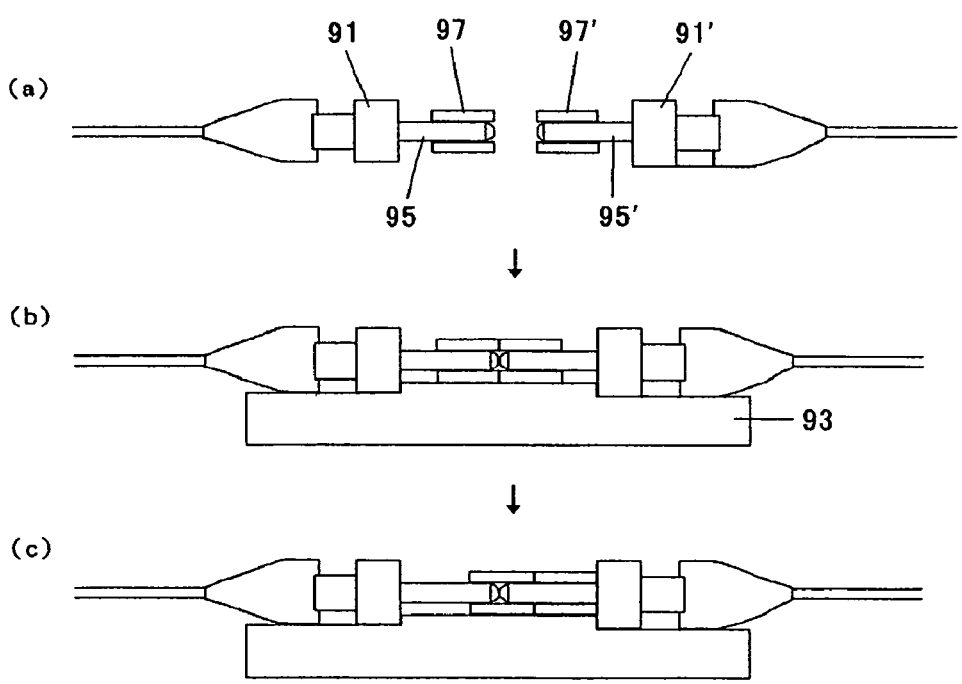
FIG. 35 is a flow chart illustrating an optical fiber connecting method according to Example 5.

Plugs 91 and 91' for connecting optical fibers and an adapter 93 made of acrylic resin were provided in the same manner as in Example 4. Metal slit sleeves 97 and 97' (products of Sanwa Denki Kogyo Co. Ltd.; made of phosphor bronze) were attached to ferrules 95 and 95' in the plugs, respectively (FIG. 35(a)). The plugs 91 and 91' were then attached downward to the adapter 93 so that the ends of the ferrules opposed near to each other (FIG. 35(b)). Thereafter, both of the slit sleeves were allowed to simultaneously slide in the right direction till the ends of two ferrules were located inside one of slit sleeves. Further, the plugs were forcedly pushed so that end surfaces came in contact with each other, thereby forming an optical fiber connection structure according to the present invention (FIG. 35(c)).

In the thus-obtained optical fiber connection structure, the optical fibers were prevented from being damaged because the plugs were attached downward, and the connection between the optical fibers was feasible with ease.

Thereafter, a connection loss was measured at the junction point of the optical fibers and found to be 0.2 dB or less. The connection structure was thus sufficiently usable as an optical connection structure.

EXAMPLE 6

Figure 36:
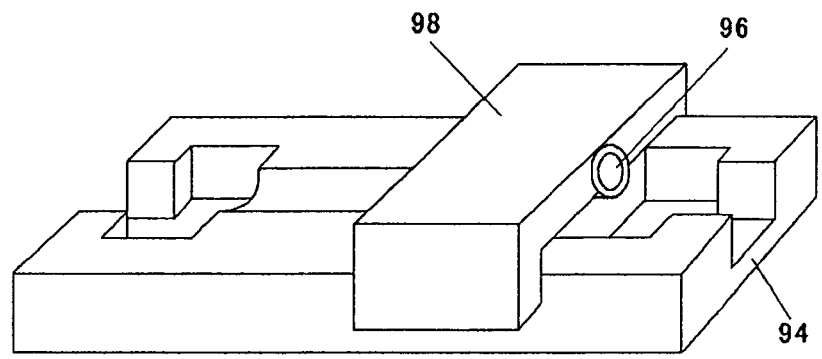
FIG. 36 is a perspective view of an adapter used in Example 6.

Plugs 91 and 91' for connecting optical fibers were provided in the same manner as in Example 4. As illustrated in FIG. 36, a sliding member 98 made of acrylic resin equipped with a metal slit sleeve 96 was put on an adapter 94 made of acrylic resin. The plug 91 was then attached downward to the adapter 94 (FIG. 37(*a*)). The sliding member 98 was allowed to slide in the left direction to put the slit sleeve 96 on the ferrule 95 (FIG. 37(*b*)).

Figure 37:
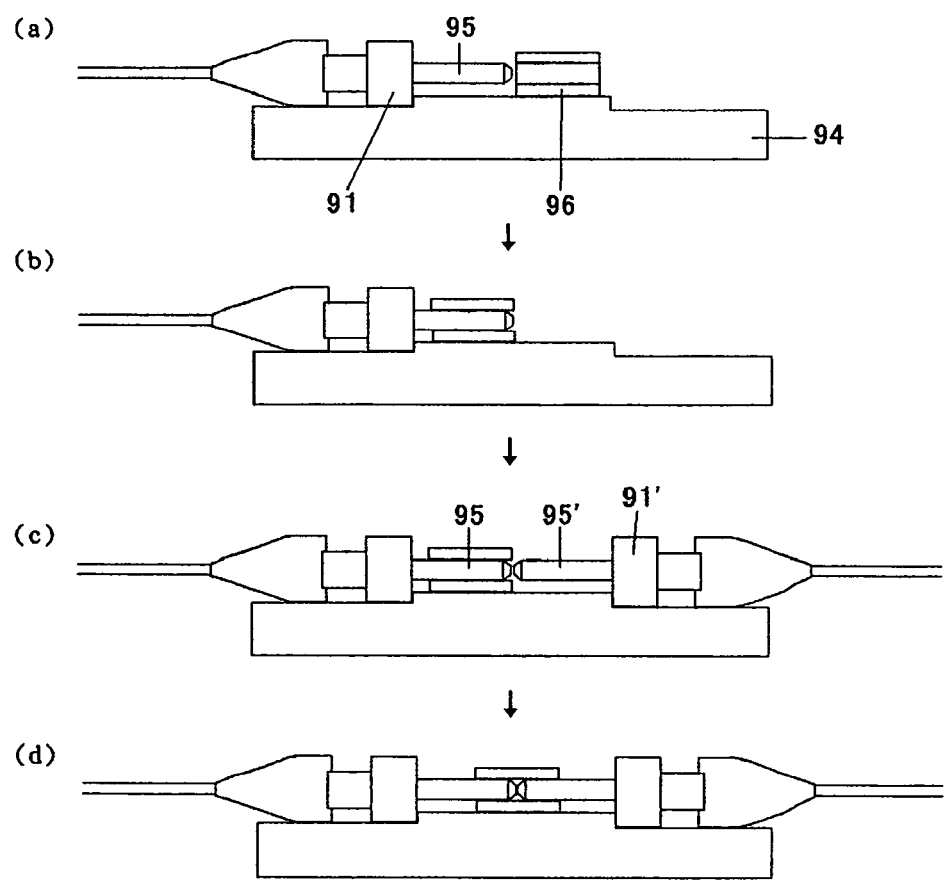
FIG. 37 is a flow chart illustrating an optical fiber connecting method according to Example 6.

The other plug 91' was then attached to the adapter 94 so that the end surfaces of the ferrules 95 and 95' opposed near to each other (FIG. 37(*c*)). Thereafter, the sliding member (98 in FIG. 36) was allowed to slide in the right direction till the ends of two ferrules were located inside the slit sleeve 96. Further, the plugs were forcedly pushed so that end surfaces came in contact with each other, thereby forming an optical fiber connection structure according to the present invention (FIG. 37(*d*)).

In the thus-obtained optical fiber connection structure, the optical fibers were prevented from being damaged because the plugs were attached downward, and the connection between the optical fibers was feasible with ease.

Thereafter, a connection loss was measured at the junction point of the optical fibers and found to be 0.2 dB or less. The connection structure was thus sufficiently usable as an optical connection structure.

EXAMPLE 7

Figure 38:
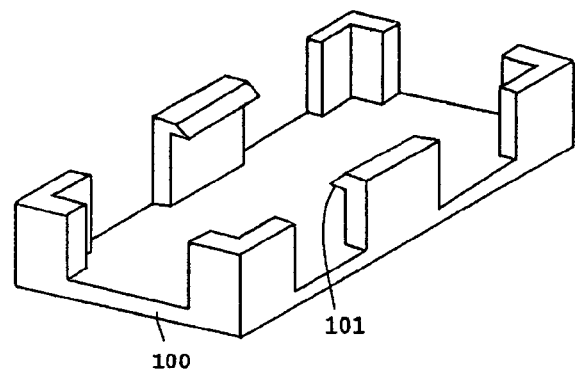
FIG. 38 is a perspective view of an adapter used in Example 7.
Figure 39:
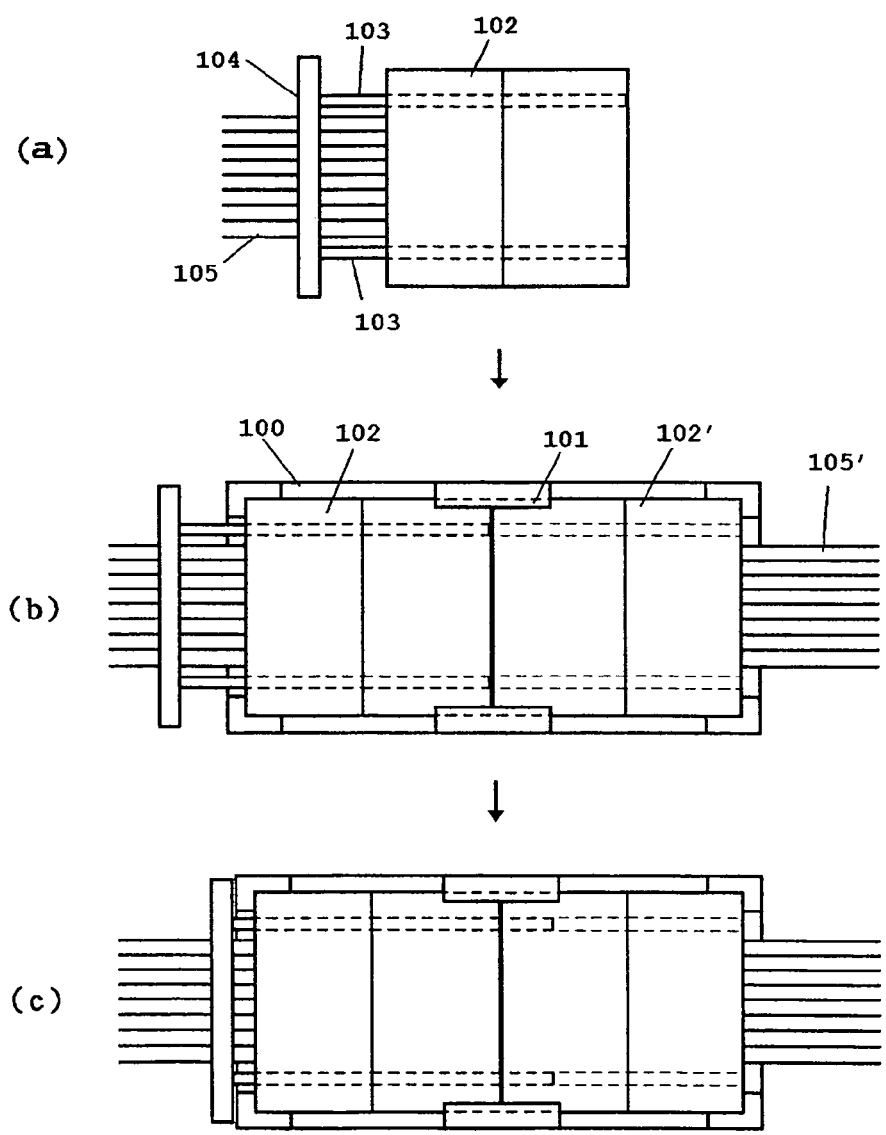
FIG. 39 is a flow chart illustrating an optical fiber connecting method according to Example 7.

An adapter 100 made of acrylic resin equipped with latches 101 as illustrated in FIG. 38 was provided. On the other hand, as illustrated in FIG. 39(*a*), 8-core MT connectors (products of Halusan Seisakusho Co., Ltd.; for single mode) were used as plugs 102 and 102', and 8-core optical fiber tapes 105 and 105' (products of The Furukawa Electric Co., Ltd.; diameter: 250 μm) were put in ferrules of the plugs respectively. Further, two guide pins 103 and 103 which were 4 mm longer than guide pin holes of the MT connector were put to a supporting member 104 for guide pins. Each guide pin 103 was then inserted in the guide pin hole of one of MT connectors so that an end of the guide pin reached to an edge of guide pin hole. After an index matching agent was applied to ends of the plugs in the above-mentioned two MT connectors, they were attached downward to the adapter 100 in a direction perpendicular to the axis of optical fibers (FIG. 39(*b*)). Thereafter, the supporting member 104 for the guide pins were forcedly pushed in the axial direction of optical fibers, thereby inserting the guide pins into guide pin holes of the other MT connector. Thus, alignment of optical fibers was performed to complete connection of optical fibers (FIG. 39(*c*).

In the above-mentioned method, connection between the optical fibers was feasible with ease. Furthermore, in the thus-obtained optical fiber connection structure, characteristic of MT connectors did not change and the optical fibers were prevented from being damaged.

Thereafter, a connection loss was measured at the junction point of the optical fibers and found to be 0.7 dB or less. The connection structure was thus sufficiently usable as an optical connection structure.

INDUSTRIAL AVAILABILITY

Since the optical fiber connection structure and the optical fiber connection method according to the present invention have above-mentioned constitution, working hours required for alignment and connection of optical fibers can be saved by attaching the plug to the adapter and, particularly, claddings, when devices having optical fibers led out of ends thereof such as optical elements, optical circuit packages, optical circuit devices, etc. are subjected to optical connecting on printed circuit boards (for example, mother board, etc.) or in an equipment. Further, ends of ferrules are prevented from damages caused by contacting with a slit sleeve or a guide shaft upon carrying out connection of optical fibers.

When plugs equipped with ferrules in which optical fibers have been fixed are used, connection of optical fibers can be performed easily in a narrow space without causing damage on the optical fibers by sliding the ferrule aligning member in a direction of the center axis of the optical fiber. Accordingly, operation for optical connecting can be performed just by moving plugs downward without a burden, and consequently, the yield of optical connecting and connecting workability are improved.

The invention claimed is:

1. An optical fiber connection structure wherein optical fibers are connected by means of a component for connecting optical fibers comprising two plugs, into which at least one optical fiber has been inserted respectively, for aligning said optical fibers and connecting them, and an adapter for fixing said plugs one by one in a direction perpendicular to the axial direction of the optical fiber, wherein said plugs are each independently detachable from the adapter in a direction perpendicular to the axial direction of the optical fiber, wherein said plug is provided with one or more ferrules having one or more ends, each ferrule of said plug is provided with a ferrule aligning member, said ferrule aligning member capable of sliding in a direction of the center axis of the optical fiber, wherein said ends of opposed ferrules brought face to face with each other are located inside said ferrule aligning member as a result of sliding the ferrule aligning member in the direction of the center axis of the optical fibers after the plugs are attached to the adapter.

2. The optical fiber connection structure according to claim 1, wherein either the plug or the adapter is equipped with a latch member and the other has a latch engaging section(s), and the plug is fixed to the adapter by engaging the latch member with the latch engaging section said ferrule aligning member is attached to the adapter.

3. The optical fiber connection structure according to claim 1, or claim 2, wherein either the plug or the adapter has a guide(s) for alignment and the other is equipped with a convex member for alignment which engages with said groove guide wherein said ferrule aligning member is attached to a ferrule of at least one of two plugs.

4. An optical fiber connecting method which comprises:

inserting at least one optical fiber into two plugs respectively, each plug having a slidable member which is capable of sliding with respect to the two plugs in an axial direction of the optical fiber;

attaching said two plugs to an adapter in a direction perpendicular to the axial direction of the optical fiber;

fixing said two plugs to the adapter, by sliding each slidable member with respect to the two plugs in the axial direction of the optical fiber, wherein each of the two plugs are provided with a ferrule;

attaching a ferrule aligning member to the ferrule of at least one of the said two plugs, said ferrule aligning member being slidable;

attaching each plug to the adapter in a direction perpendicular to the center axis of the optical fiber to fix the plugs to the adapter in such a state that the ferrules of the plugs oppose near to each other; and sliding the ferrule aligning member in a direction of the center axis of the optical fiber so that the ends of the opposed ferrules are located inside said ferrule aligning member.

5. An optical fiber connecting method which comprises:

inserting at least one optical fiber into two plugs respectively, each plug having a slidable member which is capable of sliding with respect to the two plugs in an axial direction of the optical fiber;

attaching said two plugs to an adapter in a direction perpendicular to the axial direction of the optical fiber;

fixing said two plugs to the adapter, by sliding each slidable member with respect to the two plugs in the axial direction of the optical fiber, wherein each of the two plugs are provided with a ferrule;

attaching one of two plugs, into which an optical fiber is inserted, to another adapter provided with a ferrule aligning member, said ferrule aligning member being slidable in a direction perpendicular to the center axis of the optical fiber;

sliding said ferrule aligning member so as to attach to the ferrule;

attaching the other plug to the adapter in a direction perpendicular to the center axis of the optical fiber so that the ferrules oppose near to each other; and sliding the ferrule aligning member in a direction of the center axis of the optical fiber so that the ends of opposed ferrules are located inside said ferrule aligning member.

6. The optical fiber connecting method according to claim 4 or 5, wherein the plug is equipped with a plurality of ferrules.

7. An optical fiber connecting method which comprises:

inserting at least one optical fiber into two plugs respectively, each plug having a slidable member which is capable of sliding with respect to the two plugs in an axial direction of the optical fiber;

attaching said two plugs to an adapter in a direction perpendicular to the axial direction of the optical fiber;

fixing said two plugs to the adapter, by sliding each slidable member with respect to the two plugs in the axial direction of the optical fiber, wherein the slidable member is a guide pin, and the two plugs and the adapter each have a through-hole(s) for alignment, wherein the guide pin is inserted in the though-hole of each plug, wherein sliding the slidable member comprises, inserting another guide pin into the through-hole(s) in one edge of said adapter to forcibly push said guide pin already inserted in the plug, thereby fixing the opposed plugs to the adapter.

8. The optical fiber connecting method according to claim 7, wherein a fixing member provided with a guide pin(s) and being slidable to the adapter is used as a means for insertion of another guide pin into the through-hole(s) of the adapter and the adapter is mounted on the fixing member, wherein said fixing member is slid in one direction so as to insert the guide pin into the though-hole of the adapter.

* * * * *

UNITED STATES PATENT AND TRADEMARK OFFICE
CERTIFICATE OF CORRECTION

PATENT NO. : 7,513,694 B2
APPLICATION NO. : 10/521205
DATED : April 7, 2009
INVENTOR(S) : Kyoichi Sasaki et al.

It is certified that error appears in the above-identified patent and that said Letters Patent is hereby corrected as shown below:

At column 5, line 23, after "and", please delete "61" and insert --61'--, therefor.

At column 16, line 19, in Claim 7, please delete "though-hole" and insert --through-hole--, therefor.

At column 16, line 31, in Claim 8, please delete "though-hole" and insert --through-hole--, therefor.

Signed and Sealed this

Eighth Day of December, 2009

David J. Kappos
*Director of the United States Patent and Trademark Office*